US012639390B2

(12) United States Patent
Desrosiers et al.

(10) Patent No.: US 12,639,390 B2
(45) Date of Patent: May 26, 2026

(54) SYSTEMS AND METHODS FOR COMPUTER RESEARCH MANAGEMENT USING LARGE LANGUAGE MODELS

(71) Applicant: Natural Language Labs Inc., New York, NY (US)

(72) Inventors: Christian Nicolas Desrosiers, Brooklyn, NY (US); Stephen Mugford, Cambridge, MA (US)

(73) Assignee: Natural Language Labs Inc., New York, NY (US)

( * ) Notice: Subject to any disclaimer, the term of this patent is extended or adjusted under 35 U.S.C. 154(b) by 0 days.

(21) Appl. No.: 18/827,302

(22) Filed: Sep. 6, 2024

(65) Prior Publication Data

US 2025/0086244 A1 Mar. 13, 2025

Related U.S. Application Data

(60) Provisional application No. 63/581,207, filed on Sep. 7, 2023.

(51) Int. Cl.

| | |
|---|---|
| ***G06F 16/955*** | (2019.01) |
| ***G06Q 30/0204*** | (2023.01) |
| ***G06Q 30/0241*** | (2023.01) |
| ***G06Q 30/0251*** | (2023.01) |

(52) U.S. Cl.

CPC ....... *G06F 16/955* (2019.01); *G06Q 30/0205* (2013.01); *G06Q 30/0271* (2013.01); *G06Q 30/0276* (2013.01)

(58) Field of Classification Search

CPC . G06F 16/955; G06F 16/958; G06Q 30/0205; G06Q 30/0271; G06Q 30/0276

See application file for complete search history.

(56) References Cited

U.S. PATENT DOCUMENTS

| | | | | |
|---|---|---|---|---|
| 10,204,162 | B2 * | 2/2019 | Yan | G06F 16/953 |
| 10,489,395 | B2 * | 11/2019 | Lakkur | G06F 16/986 |
| 10,534,851 | B1 * | 1/2020 | Chan | G06Q 30/0255 |
| 10,892,968 | B2 * | 1/2021 | Toksoz | H04L 43/0876 |
| 12,118,073 | B2 * | 10/2024 | Adkins | G06F 21/36 |
| 12,149,497 | B1 * | 11/2024 | Alexander | G06F 16/3329 |
| 2017/0345061 | A1 * | 11/2017 | Eidelson | G06F 16/9535 |
| 2018/0004753 | A1 * | 1/2018 | Chatterjee | G06Q 50/01 |
| 2023/0140125 | A1 * | 5/2023 | Glesinger | G06N 3/08 704/9 |

(Continued)

*Primary Examiner* — Huawen A Peng

(74) *Attorney, Agent, or Firm* — Foley & Lardner LLP

(57) ABSTRACT

Systems and methods for computer research management may include one or more processor(s) which receive a plurality of attributes generated according to an input. The processor(s) may generate, for each attribute, a plurality of content items. The processor(s) may generate, for each content item of the plurality of content items, serving criteria according to which to serve the plurality of content items, assign to each content item of the plurality of content items, a respective content item URL to cause a client device which is served content items to be redirected to a landing page URL. The processor(s)s may generate a landing page based on a content item that was interacted with, responsive to the interaction. The processor(s) may store, in one or more data structures, an association between the attribute, the content item, the landing page, and interactions of the user with the landing page.

20 Claims, 6 Drawing Sheets

(56) References Cited

U.S. PATENT DOCUMENTS

| | | | | |
|---|---|---|---|---|
| 2023/0177254 | A1* | 6/2023 | Ding | G06F 16/958<br>715/229 |
| 2024/0378251 | A1* | 11/2024 | Boyd | G06T 11/60 |

* cited by examiner

500

600

602 Receive a plurality of attributes generated according to an input

604 Generate, for each attribute, a plurality of content items

606 Generate, for each content item, serving criteria to serve the content items 608 Assign a respective content item URL, responsive to an interaction with the respective content item 610 Generate a landing page based on a content item that was interacted with 612 Store an association between the attribute, the content item, the language item, and interactions of the user

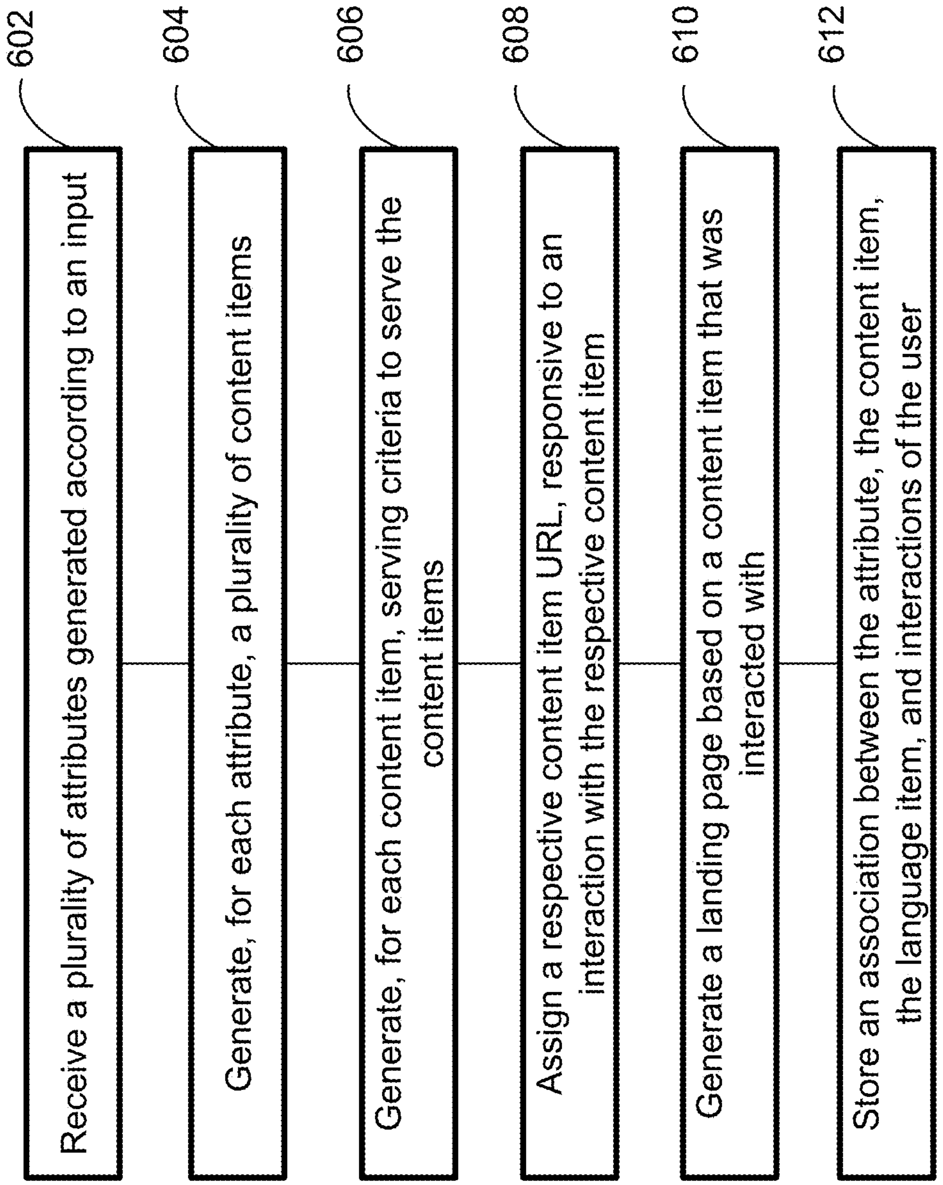

FIG. 6

SYSTEMS AND METHODS FOR COMPUTER RESEARCH MANAGEMENT USING LARGE LANGUAGE MODELS

CROSS-REFERENCE TO RELATED APPLICATIONS

This application claims the benefit of and priority to U.S. Provisional Application No. 63/581,207, filed Sep. 7, 2023, the contents of which are incorporated herein by reference in their entirety.

BACKGROUND

Artificial Intelligence (AI) and Machine Learning (ML), including Large Language Models (LLMs), are being deployed in various industries and business verticals. These technologies automate and enhance tasks, providing opportunities for deeper understanding of user behavior and streamlining content creation and delivery.

SUMMARY

In some aspects, this disclosure relates to a system including: one or more hardware processors coupled to memory and configured to: receive, from one or more feature extractors, a plurality of attributes generated according to an input; generate, using one or more large language models, for each attribute of the plurality of attributes, a plurality of content items; generate, for each content item of the plurality of content items, serving criteria according to which to serve the plurality of content items; assign to each content item of the plurality of content items, a respective content item URL to cause a client device which is served content items to be redirected to a landing page URL, responsive to an interaction with the respective content item; generate, using the one or more large language models, a landing page based on a content item that was interacted with, the landing page generated responsive to the interaction with a content item and the client device being redirected to the landing page URL; and store, in one or more data structures, an association between the attribute, the content item, the landing page, and interactions of the user with the landing page.

In some embodiments, the one or more feature extractors include a natural language processing (NLP) model configured to map the prompt to an ontology using a domain-specific language, and a classifier including a supervised machine learning model trained on a dataset, configured to generate feature vectors using the mapped prompt to the ontology, the classifier configured to identify the plurality of attributes according to the feature vectors. In some embodiments, the one or more hardware processors are further configured to generate, using the plurality of attributes, a dynamic test matrix, each matrix cell corresponding to a respective attribute of the plurality of attributes and serving criteria. In some embodiments, the one or more hardware processors are configured to generate content items that communicate information corresponding to the attribute, for serving to client devices according to the serving criteria.

In some embodiments, the one or more hardware processors are configured to generate a distinct URL for every content item, the URL being uniquely associated with the specific content item and being used to track interactions of users with that content item. In some embodiments, the one or more hardware processors are configured to: receive, from the client device, an indication of the interaction with the content item; and generate, using the one or more large language models, the landing page dynamically, responsive to receiving the indication of the interaction with the content item, wherein, to generate the landing page, the one or more hardware processors are configured to: apply the content item and the attribute as an input to the one or more large language models, to generate content of a plurality of content blocks; generate the landing page which includes at least some of the plurality of content blocks, according to a templated layout.

In some embodiments, the one or more hardware processors are configured to: transmit, responsive to receiving the indication of the interaction with the content item, to one or more servers, a request to retrieve cataloged records maintained by the one or more servers, the request including a filter according to the attribute which corresponds to the content item; receive, from the one or more servers, responsive to the request, a plurality of cataloged records; apply a ranking algorithm to the plurality of cataloged records, to identify a ranked subset of the plurality of cataloged records, based on a keyword density of each cataloged record and a priority score associated with the cataloged record; and populate the landing page with the ranked subset of cataloged records retrieved from the one or more servers. In some embodiments, the landing page generated for the content item includes a first landing page provided to a first subset of client devices which satisfy the serving criteria, and wherein the one or more large language models are configured to generate a second landing page for a second subset of clients which satisfy the serving criteria. In some embodiments, content of the first landing page and the second landing page is dynamically adjusted by the one or more large language models, using a reinforcement learning model trained based on the interactions of respective users with the first landing page and the second landing page.

In some embodiments, the interactions include at least one of clicks, hovers, or navigation patterns, and wherein the one or more hardware processors are configured to: determine one or more analytics relating to the interactions received from the client device relating to the landing page; and apply the one or more analytics to a reinforcement model associated with the one or more large language models, for generating subsequent instances of landing pages associated with the content item. In some embodiments, the one or more hardware processors are further configured to: receive, from the client device, a navigation input within the landing page; generate, using the one or more large language models, a sub-landing page within the landing page, responsive to receiving the navigation input.

In some aspects, this disclosure relates to a system, wherein the prompt relates to a deliverable, wherein each of the plurality of attributes relate to one or more features of the deliverable, and wherein the content items for a corresponding attribute each correspond to the one or more features. In some embodiments, a first landing page for a first content item of a first attribute for the deliverable is uniquely relative to a second landing page for a second content item of a second attribute for the deliverable. In some embodiments, the first landing page and the second landing page include semi-functional dummy landing pages.

In another aspect, this disclosure is directed to a method, including: transmitting, by one or more hardware processors of a computing system, to one or more feature extractors, a prompt to retrieve attributes relating to a deliverable; receiving, by the one or more hardware processors, from the one or more feature extractors, a plurality of attributes determined based on the deliverable and according to the prompt; generating, by the one or more hardware processors, using one or more large language models, for each attribute of the plurality of attributes, a plurality of content items; generating, by the one or more hardware processors, for each content item of the plurality of content items, serving criteria according to which to serve the plurality of content items; assigning, by the one or more hardware processors, to each content item of the plurality of content items, a respective content item URL to cause a client device which is served content items to be redirected to a landing page URL, responsive to an interaction with the respective content item; generating, by the one or more hardware processors, using the one or more large language models, a landing page based on a content item that was interacted with, the landing page generated responsive to the interaction with a content item and the client device being redirected to the landing page URL; and storing, by the one or more hardware processors, in one or more data structures, an association between the attribute, the content item, the landing page, and interactions of the user with the landing page.

In some embodiments, the one or more feature extractors include a natural language processing (NLP) model configured to map the prompt to an ontology using a domain-specific language, and a classifier including a supervised machine learning model trained on a dataset, configured to generate feature vectors using the mapped prompt to the ontology, the classifier configured to identify the plurality of attributes according to the feature vectors. In some embodiments, the method further includes: receiving, by the one or more hardware processors, from the client device, an indication of the interaction with the content item; and generating, by the one or more hardware processors, using the one or more large language models, the landing page dynamically, responsive to receiving the indication of the interaction with the content item, wherein generating the landing page includes: applying the content item and the attribute as an input to the one or more large language models, to generate content of a plurality of content blocks; generate the landing page which includes at least some of the plurality of content blocks, according to a templated layout.

In some embodiments, the method further includes: transmitting, by the one or more hardware processors, responsive to receiving the indication of the interaction with the content item, to one or more servers, a request to retrieve cataloged records maintained by the one or more servers, the request including a filter according to the attribute which corresponds to the content item; receiving, by the one or more hardware processors, from the one or more servers, responsive to the request, a plurality of cataloged records; applying, by the one or more hardware processors, a ranking algorithm to the plurality of cataloged records, to identify a ranked subset of the plurality of cataloged records, based on a keyword density of each cataloged record and a priority score associated with the cataloged record; and populating, by the one or more hardware processors, the landing page with the ranked subset of cataloged records retrieved from the one or more servers. In some embodiments, the landing page generated for the content item includes a first landing page provided to a first subset of client devices which satisfy the serving criteria, and wherein the one or more large language models are configured to generate a second landing page for a second subset of clients which satisfy the serving criteria, wherein content of the first landing page and the second landing page is dynamically adjusted by the one or more large language models, using a reinforcement learning model trained based on the interactions of respective users with the first landing page and the second landing page.

In some aspects, this disclosure relates to a non-transitory computer readable medium storing instructions that, when executed by one or more hardware processors, cause the one or more hardware processors to: receive, from one or more feature extractors, a plurality of attributes generated according to an input; generate, using one or more large language models, for each attribute of the plurality of attributes, a plurality of content items; generate, for each content item of the plurality of content items, serving criteria according to which to serve the content items; assign to each content item of the plurality of content items, a respective content item URL to cause a client device which is served content items to be redirected to a landing page URL, responsive to an interaction with the respective content item; generate, using the one or more large language models, a landing page based on a content item that was interacted with, the landing page generated responsive to the interaction with a content item and the client device being redirected to the landing page URL; and store, in one or more data structures, an association between the attribute, the content item, the landing page, and interactions of the user with the landing page.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 6 is a flowchart of a method for computer research management using large language model(s) (LLMs), according to an example implementation of the present disclosure.

DETAILED DESCRIPTION

Figure 1:
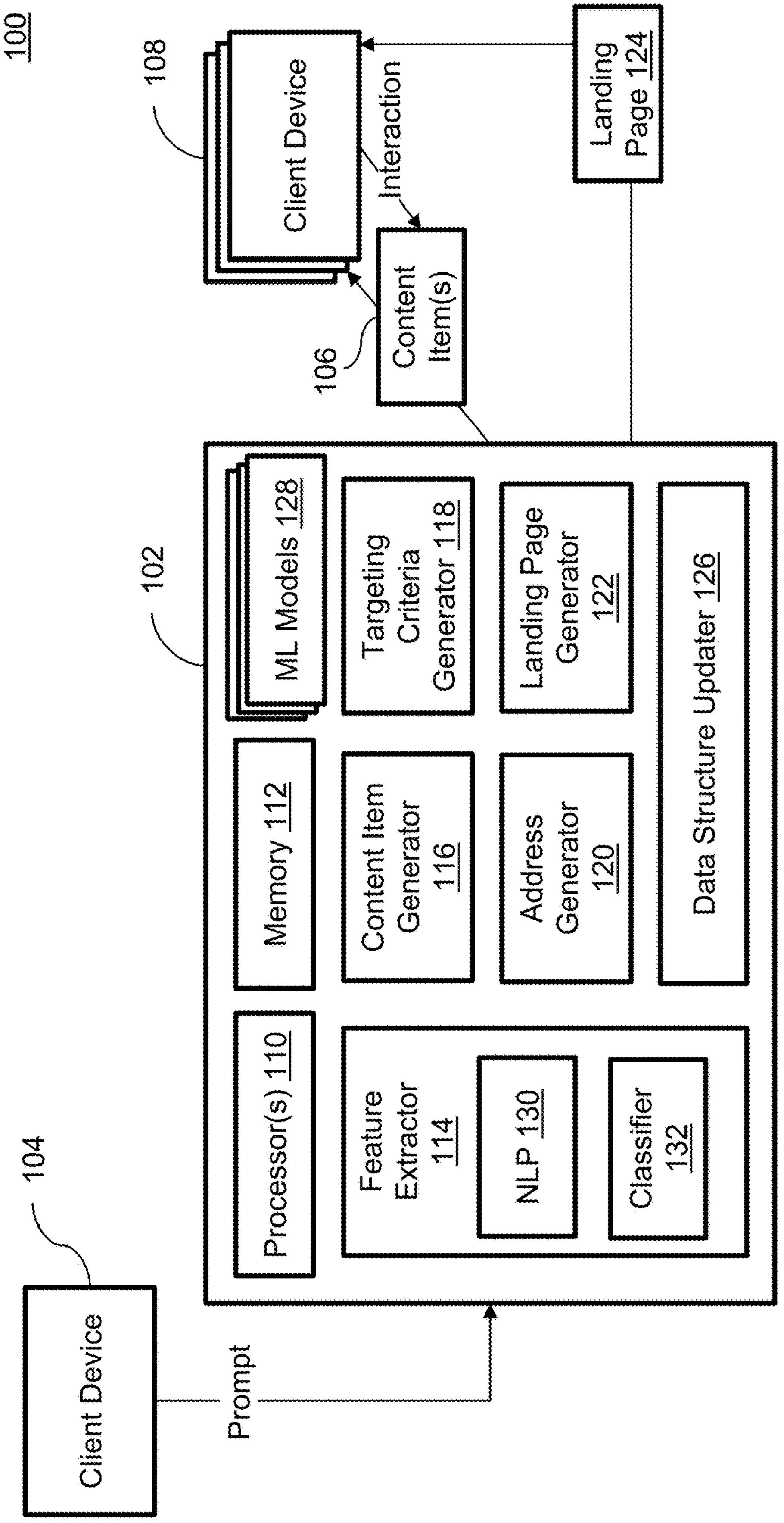
FIG. 1 is a block diagram of a system for computer research management using large language model(s) (LLMs), according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the Figures, the systems and methods described herein may be used for computer research management. The systems and methods described herein can dynamically generate, based on prompts, features and corresponding content items using various large language models and generative artificial intelligence solutions. For example, this system may use a large language model to create, determine, or otherwise derive multiple features/attributes/value propositions. For each of these features, the system generates various content items. Each content item has a unique web link (URL) which, when selected or activated by a user, takes the user to a specific page (landing page). The content of this landing page is generated (e.g., on-the-fly, dynamically, on-demand, responsive to activation/selection of the URL) based on which content item the user selected. Furthermore, the system may store an association of the relationship between the selling point, the content item, the landing page, and how users interact with that landing page.

The systems and methods described herein may have several technical benefits. For example, by leveraging a sophisticated computer model, the system may automate the creation of tailored content, leading to efficiency and scalability in content generation. By assigning unique URLs to each content item and routing to corresponding landing pages, the system allows for precise tracking and analytics. This results in detailed insights into user preferences and behaviors, allowing for data-driven decisions. By dynamically generating landing pages in response to user interactions with content items, the system avoids the need to pre-emptively create and store landing pages for every content item or present landing pages that are not personalized to the user who interacted with the content item or not current in view of more recent events that occurred since the landing page was first generated. The ability to not have to preemptively create or generate landing pages for every generated content item not only reduces computing processing but also minimizes data storage demands, resulting in cost savings and faster response times. Furthermore, using sophisticated models for automating content creation means that the system can more efficiently utilize processor cycles, delivering content at scale without significant overhead. The unique URL assignment for each content item is not just a tracking mechanism but also an optimization for server resource allocation, ensuring that resources are not wasted on less-relevant or unused content items. Additionally, the data structure, which interlinks various elements, is designed for rapid data retrieval, reducing latency and improving the overall user experience. In essence, the system's design optimally leverages computer technology to enhance both the user experience and the backend operational efficiency, while also maximizing the cost-effectiveness of digital marketing efforts.

Referring now to FIG. 1, depicted is a block diagram of a system 100 for computer research management using large language model(s) (LLMs), according to an example implementation of the present disclosure. The system 100 may include a content item generation and management system 102 (referred to generally as management system 102 or system 102). As described in greater detail below, the management system 102 may be configured to receive a prompt from a client device 104 (e.g., a first client device 104). The management system 102 may be configured to generate a number of value propositions (also referred to as features/attributes) based on the prompt, and generate, for each value proposition, a plurality of content items 106 for serving to other client devices 108. The content items 106 may be served to client devices 108 based on or according to content item targeting criteria determined by the management system 102. When a client device 108 interacts with a content item 106 served thereto, the client device 108 may be routed to a content item address (e.g., content item URL) set by the management system 102 for the content item 106. Responsive to the client device 108 interacting with the content item 106, the system 102 may generate a landing page 124 for the content item 106. The system 102 may store an association in one or more data structures, between the content item 106, address, and various interaction(s) of the user with the content item 106.

The system 100 may include various client devices 104, 108. The client devices 104, 108 may be or include any computing device configured to be operated by users. For example, the client devices 104, 108 may be or include personal computers, laptops, tablets, mobile devices, smartphones, or any other computing device. In some embodiments, the client device 104 may be a device which corresponds to the management system 102 and/or a client device 104 associated with a vendor/enterprise/entity using or otherwise interacting with the management system 102. The client devices 108 may be devices corresponding to a target audience (e.g., end users which are to receive content items generated by the management system 102 according to the targeting criteria).

The management system 102 includes one or more hardware processors 110 coupled to memory 112. The processor(s) 110 may be or include any type or form of processors, including microprocessors, dedicated compute devices, controllers, etc. Similarly, memory 112 may be or include any type or form of data structure or data store. The management system 102 may include various processing engines. The processing engines may be or include any device, component, element, or hardware designed or configured to perform various functions as described herein. In various embodiments, the processing engines may be configured as discrete processing components which are configured according to instructions stored on memory 112 which, when executed (e.g., by any combination of the processor(s) 110) cause the management system 102 to perform the various functions described herein. The processing engine(s) may include, among other components, a feature extractor 114, a content item generator 116, a targeting criteria generator 118, an address generator 120, a landing page generator 122, a data structure updater 126, and one or more machine learning (ML) models 128. While described as discrete processing engines, in various embodiments, any one of the processing engines may be combined with another processing engine. Additionally, various processing engine(s) may leverage resources, components, elements, or hardware from various third-party sources.

Figure 2:
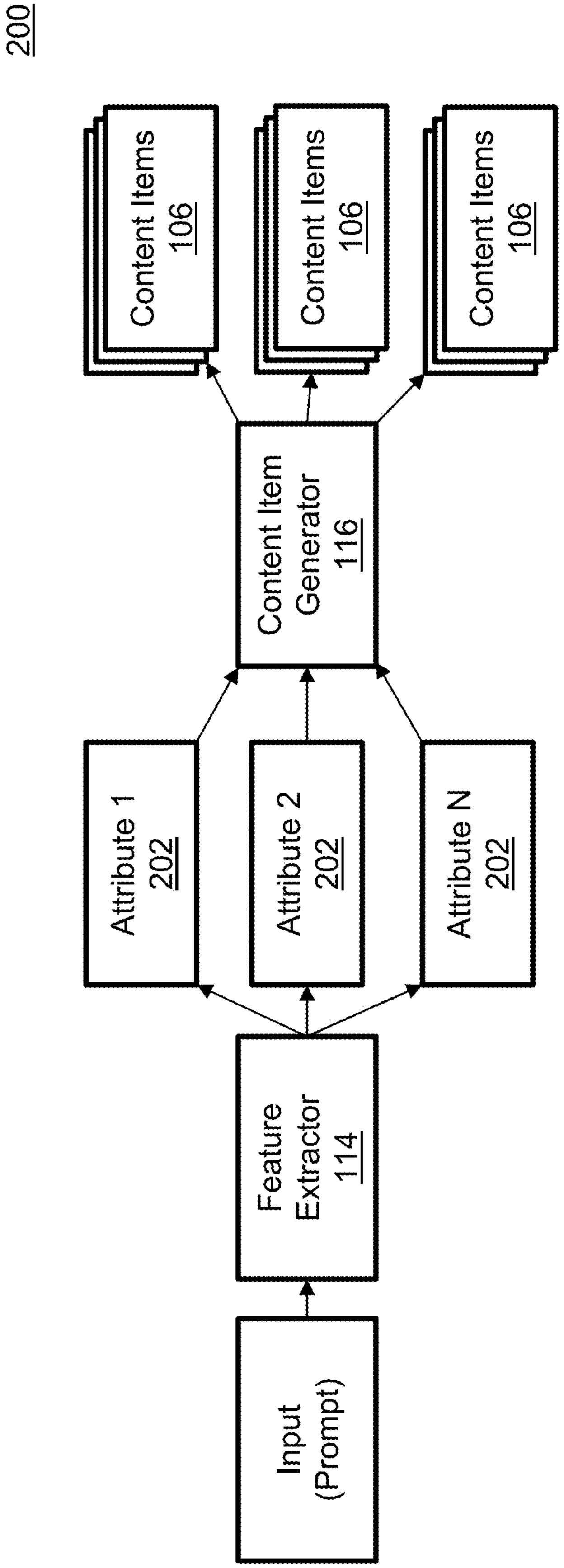
FIG. 2 is a block diagram of the system of FIG. 1 when generating content items, according to an example implementation of the present disclosure.

Referring to FIG. 1 and FIG. 2, the feature extractor 114 may be configured to receive an input (e.g., a prompt) from the client device 104. This prompt is designed to guide the large language model in generating a plurality of attributes, features, and/or value propositions for a specific deliverable. The prompt could be, for example, a question or a statement related to the deliverable, its features, its benefits, or its target market. The prompt is formulated in such a way that it encourages the feature extractor 114 to generate a diverse range of value propositions that cover different aspects of the product and its potential appeal to customers. In some embodiments, and as described in greater detail below, the feature extractor 114 may be configured to use or interact with a natural language processor 130 and a classifier 132, to generate the attributes/features/value propositions relating to the deliverable from the prompt. In the context of this system, the feature extractor 114 is used to generate a plurality of attributes 202 for a given prompt. An attribute, in this context, may be include data indicative of various information related to a product/service/widget/deliverable which is a subject of the prompt, including (for example)

how a deliverable solves a customer's problem, delivers specific benefits, and/or tells the customer why they should buy the deliverable from a particular company instead of from a competitor. In some embodiments, the feature extractor 114 may be configured to provide the prompt to a large language model, which then generates a plurality of such attributes for a given prompt and corresponding widget. The large language model uses its understanding of language, context, and the specific prompt to generate a plurality of attributes for the product. Each attribute may be or include a statement that highlights a specific aspect of the product, explains how this aspect solves a customer's problem or meets a customer's need, and articulates why this aspect makes the product a better choice than competing products.

Based on the output of the feature extractor 114, the management system 102 may be configured to generate a plurality of content items 106 for each attribute. In some embodiments, the feature extractor 114 may be configured to communicate, transmit, or otherwise provide the attributes 202 to the content item generator 116. The content item generator 116 may be configured to generate, produce, create, or otherwise provide a plurality of content items 106 for each attribute. In some embodiments, the content item generator 116 may be configured to use or leverage various generative artificial intelligence (AI) platforms or technologies (such as various large language models, generative adversarial networks, and so forth) to generate the content items. A content item, in this context, can be any content that is used to communicate the attribute to potential customers. This could include, for example, advertisements, social media posts, blog articles, product descriptions, and more. In some embodiments, each content item 106 may be or include content that highlights a specific aspect of the attribute (e.g., explains how this aspect solves a customer's problem or meets a customer's need, articulates why this aspect makes the product a better choice than competing products, etc.).

In some embodiments, the content item generator 116 may be configured to generate additional content items 106 based on interactions (or lack of interactions) with previously generated content items 106 generated according to the prompt. In this regard, the content item generator 116 may be configured to generate new permutations of related content items 106, to autonomously test/serve/refine content items 106 according to changing deliverable segments, user interactions, and the like.

Figure 3:
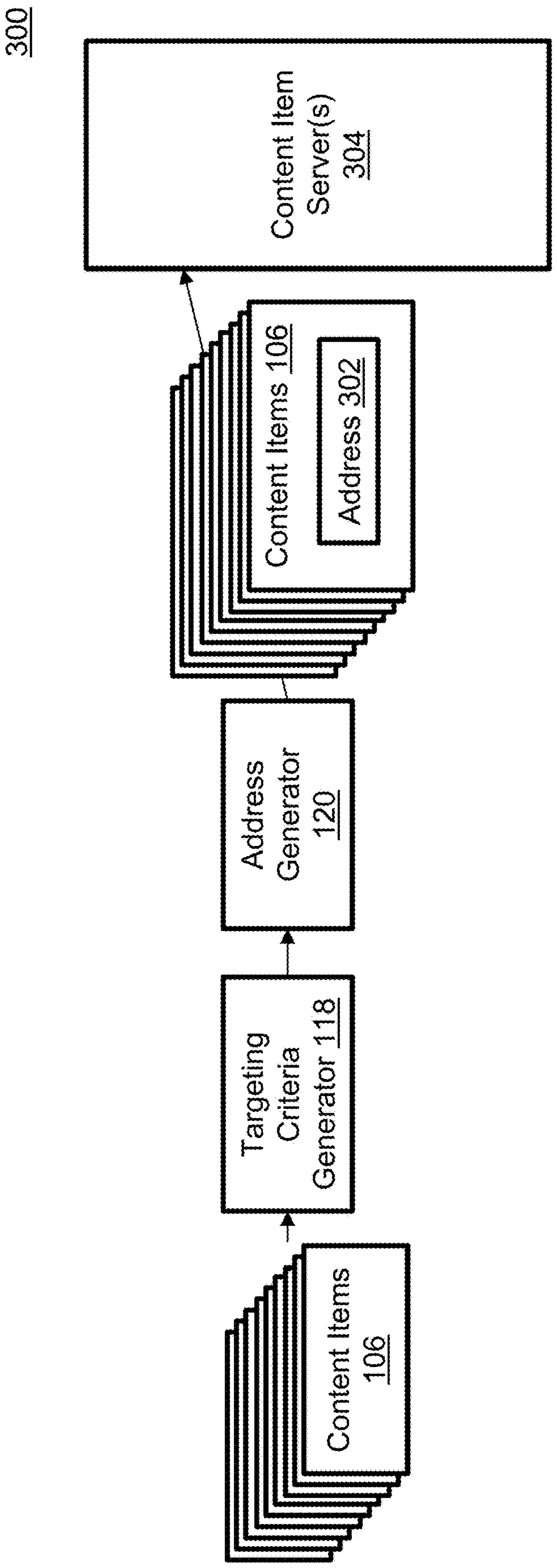
FIG. 3 is a block diagram of the system of FIG. 1 when serving content items, according to an example implementation of the present disclosure.

Referring now to FIG. 2 and FIG. 3, following the generation of content items 106, the management system 102 may be configured to generate, determine, select, or otherwise identify content item targeting criteria for every content item. In some embodiments, the targeting criteria generator 118 may be configured to identify the content item targeting criteria. The content item targeting criteria may be or include parameters or conditions that determine how, when, and to whom the content items are served. These criteria can include, for example, demographic information, geographic location, user behavior, and other factors that are relevant to the effective delivery/serving of the content items by a content item server 304. The process of generating content item targeting criteria begins with the system analyzing the content items and the attributes they are based on. For example, the targeting criteria generator 118 may be configured to analyze the content items and attributes, to identify the characteristics of the potential customers who are likely to be interested in the attributes and responsive to the content items. These characteristics may form the basis of the content item targeting criteria. The targeting criteria generator 118 may be configured to determine or identify the criteria that are likely to result in the content items being served to the potential customers who are the most likely to respond positively to them.

In some embodiments, the targeting criteria generator 118 may be configured to uses various techniques and algorithms to make this determination, taking into account factors such as the characteristics of the potential customers, the nature of the product, the features and benefits highlighted in the attributes, and the content and format of the content items. For example, the targeting criteria generator 118 may be configured to use a blend of machine learning techniques to determine the targeting criteria. As an example, the targeting criteria generator 118 may be configured to use supervised machine learning methods, like Logistic Regression and Random Forests, to predict responses based on historical data. Similarly, the targeting criteria generator 118 may be configured to use clustering, like K-Means, to segment users for tailored content delivery, and reinforcement learning, such as Multi-Armed Bandit algorithms, to balance trying new strategies with using proven ones. The targeting criteria generator 118 may be configured to use collaborative filtering to suggest content based on similar users' preferences. Additionally or alternatively, the targeting criteria generator 118 may be configured to use deep learning, with neural networks, to uncovers intricate patterns in massive datasets, and NLP's sentiment analysis to evaluate user feedback. The targeting criteria generator 118 may be configured to use recursive feature elimination to identify influential user attributes which contribute to more likely to either interacting with (or not interacting with) a content item. The targeting criteria generator 118 may be configured to use association rule mining, e.g., Apriori, to identify behaviors linked to positive content item responses. The targeting criteria generator 118 may be configured to use ensemble methods to merge insights from multiple models (e.g., any combination of the above-mentioned models or algorithms) to determine the targeting criteria.

Once the content item targeting criteria (e.g., serving criteria) have been generated, the targeting criteria generator 118 may be configured to associate the content item targeting criteria with the corresponding content items. This association allows content item servers 304 to serve the content items according to the targeting criteria, ensuring that the content items are delivered to the potential customers who are the most likely to be interested in them and responsive to them. The system is configured to dynamically adjust the content item targeting criteria based on feedback and performance data, allowing for continuous optimization of the content item delivery process by updating the parameters of at least one ML model 128. The targeting criteria generator 118 can utilize large language models to generate targeting criteria based on the attributes of the product or service to be tested.

The management system 102 may be configured to assign an address 302 for each content item. In some embodiments, the address generator 120 may be configured to establish, determine, set, or otherwise assign a content item URL to every content item. The content item URL may be or include a specific address that is associated with a particular content item 106. This URL is designed to be used as a link that can be clicked on, tapped by, selected, or otherwise interacted with by a user of a client device 108 (e.g., to which the content item 106 is served), leading them to a specific location on the internet. In the context of this system, the content item URL is configured to route a client device to a landing page 124. The address generator 120 may be configured to generate a distinct URL for every content item. This URL is generated in such a way that it is uniquely associated with the specific content item and can be used to track the interactions of users with that content item. The address generator 120 may be configured to use various techniques and algorithms to generate the addresses 302, ensuring that they are distinct, trackable, and can be reliably used to route client devices to the appropriate landing page URLs. Once the address 302, content items 106, and targeting criteria are determined by the management system 102, the management system 102 may be configured to provision the content items 106 (e.g., with the corresponding addresses 302 and targeting criteria) to the content item server(s) 304 for serving the content items to client devices 108 according to the targeting criteria.

Figure 4:
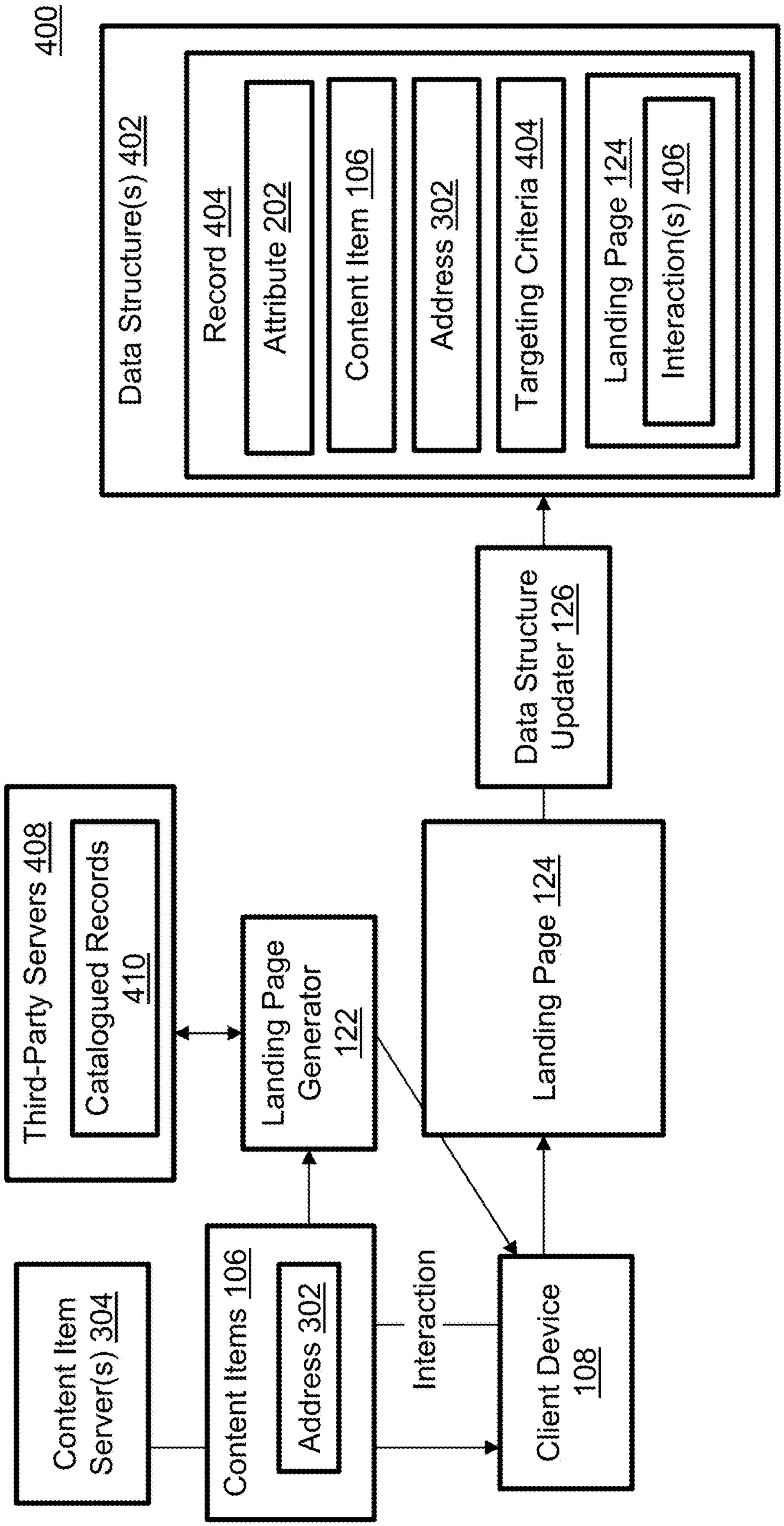
FIG. 4 is a block diagram of the system of FIG. 1 when tracking interactions with content items and landing pages, according to an example implementation of the present disclosure.

Referring now to FIG. 4, the content item server(s) 304 may be configured to communicate, transmit, send, provide, or otherwise serve content items 106 to client devices 108 according to the targeting criteria. In various instances, a user of a client device 108 may interact with a content item 106 served to the client device 108. For example, the user may select a user interface element of the content item 106 to launch a page corresponding to the content item. In response to the user interacting with the user interface element of the content item, the client device 108 may be directed to the address 302 corresponding to the content item 106. In response to the user interacting with the content item 106, the landing page generator 122 may be configured to generate, produce, or otherwise establish a landing page 124 (e.g., on the fly, on-demand, ad hoc, dynamically, and so forth). In this regard, the landing page 124 may be generated in response to a user interacting with a particular content item. As such, the landing page generator 122 may forego generating landing pages associated with content items 106 which are not interacted with.

In some embodiments, the landing page generator 122 may be configured to generate a landing page 124 based on a content item 106 that was clicked on or otherwise interacted with. The landing page 124 may be a specific webpage designed to provide more detailed information about the product or service being advertised in the content item 106. In some embodiments, the landing page generator 122 may be configured to generate the landing page using a generative AI system or technology. For example, the landing page generator 122 may be configured to generate the landing page 124 by providing a prompt to the generative AI system. This prompt is based on the content item that was clicked on by the user and is designed to guide the generative AI system in generating a landing page that is relevant the content item. The prompt could include, for example, information about the product or service being advertised, the attribute communicated in the content item, and the user's interaction with the content item. The generative AI system may be configured to generate the landing page 124 based on or according to the prompt. The landing page 124 may include, for example, detailed information about the product or service, customer testimonials, calls to action, and other elements designed to engage the user and encourage them to take a desired action, such as making a purchase or signing up for a newsletter. The landing page generator 122 may be configured to provision or otherwise provide the landing page 124 to the client device 108 (e.g., by providing the landing page 124 at the address 302 such that, when accessed, the client device 108 renders the landing page 124 in substantially real-time).

In some embodiments, the landing page generator 122 may be configured to generate the landing page 124 to include information from various third-party sources. For example, and as described in greater detail below, the landing page generator 122 may be configured to query (e.g., by generating a request, an API call, etc.) a third-party server 408 for a plurality of catalogued records 410 relating to the prompt (e.g., the deliverable associated with the prompt). For example, the catalogued records 410 may include a plurality of deliverable options relating to the deliverable associated with the prompt. The landing page generator 122 may be configured to generate the landing page to include at least some of the catalogued records 410 received from the third-party server(s). As an example, where the deliverable is a product, the landing page generator 122 may be configured to incorporate a plurality of catalogued records 410 from the third-party servers 408 which are the same product type. In some embodiments, the landing page generator 122 may be configured to rank, sort, and/or filter the catalogued records using various criteria and priorities (e.g., criteria relating to the attribute/attribute relating to the content item that was interacted with, priority assigned to sources of the deliverable linked to the catalogued records, and so forth). In this regard, the landing page generator 122 may be configured to populate the landing page 124 with a subset of the catalogued records 410, based on or according to the ranking, sorting, and/or filtering of the catalogued records 410.

Following the generation of the landing page, the data structure updater 126 may be configured to store an association between the attribute, the content item, the landing page, and interactions of the user with the landing page in one or more data structures. This process involves creating a record 404 in the data structure 402 that links the attribute, the content item, the landing page, and the user interactions together. Each record 404 in the data structure represents a specific instance of a user interacting with a content item and the corresponding landing page. The data structure 402 used to store this association can be any type of data structure that allows for efficient storage and retrieval of data, such as a database, a hash table, a tree, a graph, or any other suitable data structure. The specific choice of data structure can depend on various factors, such as the volume of data to be stored, the frequency of data access, the complexity of the data, and the specific requirements of the system.

The data structure updater 126 may be configured to dynamically update the data structures as new data is generated. For instance, when a user interacts with a content item and is routed to a landing page, the system records this interaction in the data structure. This allows the system to maintain an up-to-date record of user interactions, which can be used for analysis and optimization purposes. The data structures 402 may be designed or configured to support complex queries and analyses. For example, the system can perform queries to retrieve all records associated with a specific attribute, content item, or landing page. The system can also perform analyses to identify patterns and trends in the data, such as which attributes or content items are the most engaging, or how users interact with different landing pages. These capabilities enable the system to derive valuable insights from the data, which can be used to optimize the system and improve its effectiveness.

The association stored in the data structure 402 provides valuable information that can be used to track and analyze user behavior and preferences. For instance, by analyzing the associations, the management system 102 can identify patterns in user behavior, such as which attributes and content items are the most engaging, which landing pages are the most effective, and how users interact with different elements of the landing pages. This information can be used to optimize the management system 102, improve the effectiveness of the content items and landing pages, and better understand the preferences and behavior of the users. Furthermore, the stored associations allow the system to maintain a history of user interactions. The history can also be used to analyze trends over time, evaluate the performance of the system, and make data-driven decisions. Through this process, the system leverages the capabilities of the large language model and the hardware processors to store an association between the attribute, the content item, the landing page, and interactions of the user with the landing page in one or more data structures. This allows the system to track and analyze user behavior and preferences, providing valuable insights that can be used to optimize the system and improve its effectiveness.

In some embodiments, the data structure updater 126 may be configured to store, maintain, or otherwise incorporate the association data in a third-party data structure 402. For example, the third-party data structure 402 may be or include a customer relationship management (CRM) system, an inventory management system, or the like. Such implementations and embodiments may provide for detailed insights in such systems accessible by an entity corresponding to the input/prompt, thereby seamlessly providing various additional technical benefits, such as user behavior tracking and lead generation, campaign attribution and performance benchmarking, closed-loop reporting, and improved targeting and re-targeting.

Figure 5:
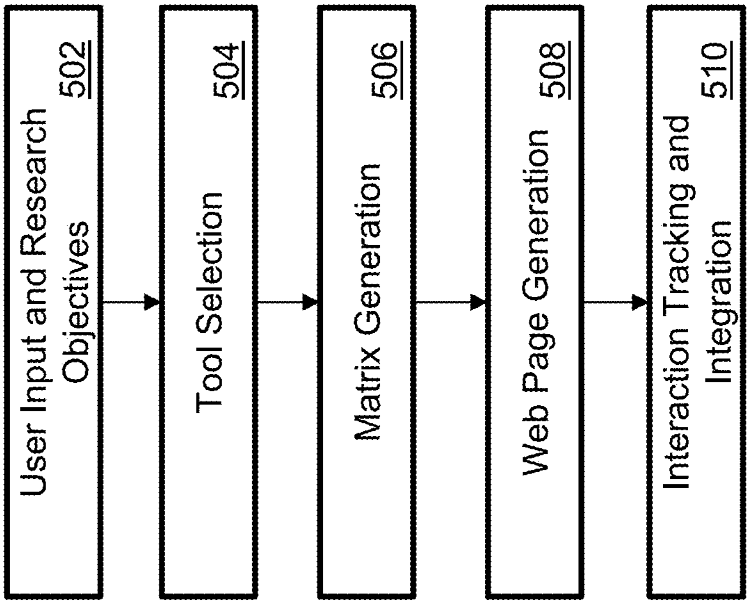
FIG. 5 is a flow diagram of a process to generate content items, serve content items, and track interactions with content items and landing pages, according to an example implementation of the present disclosure.

Referring now to FIG. 5, depicted is a flow diagram of a process 500 to generate content items 106, serve content items 106, and track interactions with content items and landing pages 124. At step 502, the processor 110 or feature extractor 114 can detect, obtain, or otherwise receive a user input (e.g., prompt) from the client device 104. The user input can correspond to a selection of a product (or deliverable), a response to a survey, a question related to a product, information associated with a product, and the like. Upon reception of the user input, the natural language processing (NLP) model 130 can parse, analyze, or otherwise extrapolate the user input to determine a research objective of the user. The research objective can be a purpose for the user input (e.g., purchasing the product, comparison between products, research on a product, price tracking, etc.). Using this process, the NLP model 130 (e.g., NLP model) can map the research objectives to a domain-specific language (DSL) for research contexts associated with the research objectives. The DSL can be, for example, Structured Query Language (SQL) or Language Integrated Query (LINQ), to map the research objectives according to an ontology or taxonomy of an entity.

Once the user input is parsed, the processor 110 can use a supervised machine learning (ML) model (e.g., a classifier 132) to classify, assign, or otherwise arrange the research objective into one or more topics and values. The one or more topics and values can correspond to categories associated with the product within the research objective of the user. The classifier 130 can generate feature vectors using the parsed user input as an input data point within a vector space. The classifier 132 can use the input data points to make predictions for the categories associated with the product. In operation, the processor 110 can collect, receive, or otherwise obtain a plurality of user inputs to generate the input data points within the vector space by extracting features from each user input of the plurality of user inputs. As the processor 110 populates the feature vectors, the processor 110 can normalize or standardize features (e.g., topics, values, research objectives) to create equality within the vector space. In this manner, the processor 110 can employ a plurality of encoding categorical features (e.g., one-hot encoding, label encoding, ordinal encoding) to generate the feature vector as, for example, a one dimensional array. Upon generation of the feature vector, the processor 110 can feed the feature vector into the classifier 132 that includes/uses a ML model 128 to make predictions on the topics and values associated with categories associated with the product. Since the classifier 130 is supervised, the classifier 132 can adjust is parameters based on the feature vectors while training.

At step 504, the processor 110 can execute, apply, or otherwise perform a tool matching algorithm (e.g., rule-based engine) based on the classified topics and values (e.g., categories). The rule based engine can select the at least one research tool based on tool performance metrics, historical success rates, contextual relevance, among other factors. Research tools may include, for example, targeted advertising, targeted surveys, queries, focus groups, and so forth. At step 506, the processor 110 can execute, apply, or otherwise perform a combinatorial algorithm to generate a dynamic test matrix. The combinatorial algorithm can evaluate possible attributes 202 for a plurality of market segments, using the results of the rule-based engine. From here, the processor 110 can use the dynamic test matrix to create a plurality of hypotheses (e.g., topics and values). In further detail, each cell of the dynamic test matrix can correspond to serving criteria and the one or more topics and values.

Following generating the matrix, the processor 110 can use the content item generator 116 that leverages a ML model 128 to generate one or more content items. In some embodiments, the ML model 128 may be or include a pre-trained generative model 128. The pre-trained generative model 128 can be trained from or more training datasets based on previously captured advertising data, marketing data, marketing segments, and content items. By applying the pre-trained generative model 128 to the dynamic test matrix, the content item generator 116 can generate the advertisements for the user of the client device 104. Each advertisement can be generated in accordance with the corresponding hypothesis within the matrix cell of the dynamic test matrix. The content item generator 116 can design/generate/configure/establish/produce/provide content items according to the hypothesis which is to be tested.

At step 506, the processor 110 can transmit, send, or otherwise provide a request to retrieve cataloged records 410 maintained by the third-party servers 408. The request can be an application programing interface (API) call to the third-party servers 408. The third-party servers 408 can include a plurality of search engines such as GOOGLE, YAHOO, BING, etc., a plurality of distribution or product services, such as AMAZON, and so forth, each of which may include, maintain, or otherwise store cataloged records 410. In some cases, the processor 110 transmit the request in response to receiving an indication of the interaction with the content item 106. The request can include a filter according to the attribute that corresponds to the content item 106 to suggest content (e.g., to include in the landing page 124) based on similar deliverables which satisfy the attribute. The request can cause the one or more third-party servers 408 to query the cataloged records 410 based on the filer. In this manner, the request can cause the third-party servers 408 to narrow the catalogued records 410 into a subset that corresponds to the attribute. Once the third-party servers 408 filter the cataloged records 410 into the subset, the third-party servers 408 can transmit the subset or the plurality of cataloged records to the processor 110.

Upon reception of the plurality of cataloged records, the processor 110 can apply a ranking algorithm to the plurality of cataloged records. The ranking algorithm can generate a sorted list, an ordered list, a ranked list, among other lists for each product within the catalogue records by leveraging a plurality of factors (e.g., keyword density, priority score, product popularity, price, search query, stock levels, product source, etc.). For example, the ranking algorithm can rank the products by keyword density and property score to generate the sorted list. In another example, the ranking algorithm can rank the products by keyword density and product source (e.g., product manufacturer or distributor) to generate the sorted list. By applying the ranking algorithm the plurality of catalogue records, the processor 110 can identify, determine, or otherwise generate a ranked subset of catalogue records (e.g., sorted list, ordered list) for display on the landing page 124. In this manner, the systems and methods described herein can generate a list of products that are in accordance with the user's research objectives. Once the ranked subset of catalogue records are generated, the processor 110 can trigger or cause the client device 108 to populate the landing page 124 with the ranked subset of cataloged records retrieved from the content item server 304.

At step 508, the processor 110 can receive, retrieve, or otherwise obtain the indication of the interaction with the content item 106 as described above. In response to the processor 110 receiving the indication of the interaction, the landing page generator 122 can use the ML models 128 (e.g., a template engine) can generate the landing page 124 dynamically (on-the-fly). In this manner, the user can be presented with a webpage on the client device 108 associated with a plurality of products based on the catalogue records, thereby saving computing resources, computing utilization, and time by dynamically generating the landing pages 124. For example, on the client device 108, the user can interact (e.g., click on) the content item 106 displayed on the client device 108. Each time the user interacts with the content item 106, the processor 110 can receive an indication of the interaction from the client device 108. From here, the landing page generator 122 can dynamically generate the landing page 124 for presentation at the client device 108 in accordance with the interacted content item 106.

While generating the landing page 124, the landing page 124 can provide the content items and the attributes (e.g., research objectives) to the landing page generator 122 (e.g., large language model) to generate the content of a plurality of content blocks within the landing page 124. The plurality of content blocks can include text, images, videos, buttons, among other forms of embedded data. For example, the content blocks of the landing page 124 can include text and images associated with the product from the catalogue records. In another example, the content blocks of the landing page 124 can include videos, and buttons associated with the product from the catalogue records. In some instances, the content item generator 116 and the landing page generator 122 can apply user information (e.g., demographics, geographical location, age, habits, hobbies, etc.) to generate content blocks personalized for the respective user of the client device 108. For example, the user of the client device 108 can be located in a specific geographical region of the world while searching for a product. The landing page generator 122 can generate content blocks that include images in accordance with the geographical region of the user and the product to induce an interaction between the user and the content blocks.

The landing pages 124 generated for the content item can include a plurality of landing pages 124. Each landing page 124 can satisfy a plurality of serving criteria for the client devices 108. For instance, the landing page generator 122 can generate and provide a first landing page to a subset or a plurality of client devices 108 that satisfy the serving criteria. Concurrently, the landing page generator 122 can generate and provide a second landing page to a second subset or a second plurality of client devices 108 that satisfy the serving criteria. The first and second landing pages can be used for A/B testing. Additionally, the content of the first landing page 124 and the second landing page 124 can be dynamically adjusted by the landing page generator 122 using interactions at the first language page 124 and second language page 124 by applying the interaction to the ML models 128 (e.g., reinforcement learning model). In this manner, the systems and method described herein can generate landing pages 124 for various subsets of client devices 108 as variations described herein.

The landing pages 124 can include an interactive chat bot to provide information to the user, ask questions (e.g., surveys), help the user navigate the landing page 124, and monitor the interaction with the landing page 124. The chat bot can be an artificial intelligence/ML model 128 that uses NLP to engage with the users of the landing page 124 in real time while performing tasks based on the users' input. For example, the chat bot can update the landing page 124 in accordance with information about the product provided by the user. The questions asked by the chat bot can be generated in real time in response to answers provided by the user. Furthermore, the chat bot can use the users research objectives to generate subsequent questions. The chatbot can analyze the user visiting the landing page as "suitable" for the product based on the responses to the questions, while utilizing with the rankings output from the ranking algorithm.

At step 510, upon generation of each content block in the plurality of content blocks, the landing page generator 122 can generate the landing page 124 to include at least some of the plurality of content blocks using a template layout. The landing page generator 122 can determine the template layout based one a plurality of testing setups/scripts, such as A/B testing, Multivariate testing (MVT), Split URL testing, Bandit Testing, Incrementality testing, and the like. Each user of the client device 108 can be presented with a different variation of the template layout and content to further customize/personalize/adjust the landing page 124 for the respective user. In this manner, the management system 102 can gather, determine or otherwise identify analytics associated with interactions (e.g., clicks, hovers, navigation patterns) based on the variation of the landing page 124 presented to the user. The analytics can indicate one or more preferences of the user when viewing the landing page 124. The processor 110 can apply the analytics to the ML models 128 (e.g., reinforcement model) associated with the feature extractor 114 to generate subsequent instances of landing pages 124 in accordance with the one or more preferences, thereby generating landing pages 124 personalized for the respective user of the client device 108.

While the landing pages 124 are presented on the client device 108, the data structure updater 126 can receive, retrieve, or otherwise obtain navigation inputs from the client device 108. The navigation inputs can be similar to the interactions, such as hovers, clicks, zoom ins, mouse navigation, to highlight, focus, or interact with respective content blocks within the landing page 124. Furthermore, the navigation inputs can form the history for the user of the client device 108 as described above. For example, a user of the client device 108 and hover over an image of a product within the landing page 124 thereby showing interest in the product. In another example, a user of a client device can scroll through the webpage to find videos associated with the product. In another example, the user can avoid one or more images of the product while interacting with various videos of the product. Using the navigation inputs, the data structure updater 126 can provide the ML models 128 and various weights/configurations/templates/settings of the landing page generator 122 to generate a sub-landing page 124 within the landing page 124. The sub-landing page can be a subsequent landing page that includes a plurality of content items using the layout of the template page and the content blocks of interest according to the navigation inputs. The sub-landing page can further capture the users interests and tendencies by being tailored to the user's interaction history and navigation inputs with the landing page 124.

Referring now to FIG. 6, depicted is a flowchart showing a method for computer research management using large language model(s) (LLMs). The method 600 may be performed by, implemented on, or otherwise executed by the components, elements, or hardware described above with reference to FIGS. 1-4. For example, the method 600 may be executed by the components of FIG. 1 and FIG. 2. As a brief overview, at step 602, one or more processors can receive a plurality of attributes generated according to an input. At step 604, the one or more processors can generate, for each attribute, a plurality of content items. At step 606, the one or more processors can generate, for each content item, serving criteria to serve the content items. At step 608, the one or more processors can assign a respective content item URL, responsive to an interaction with the respective content item. At step 610, the one or more processors can generate a landing page based on a content item that was interacted with. At step 612, the one or more processors can store an association between the attribute, the content item, the language item, and interactions of the user.

At step 602, one or more processors (e.g., feature extractor 114) can generate a plurality of attributes 202 (e.g., value propositions or features) generated according to an input (e.g., prompt). The processor 110 can receive the prompt from the client device 104. The processor 110 can use one or more feature extractors 114 which includes a natural language processing (NLP) model 130. The processor 110 can feed the prompt to one or more NLP model 130 to extract features within the prompt (e.g., by mapping the prompt to a taxonomy and/or ontology. The features extracted from the prompt can include questions about a deliverable (e.g., product), statements about the product, inquiries about the product, price of the product, and the like.

Once the features are extracted, the NLP model 130 can generate the plurality of attributes that map the prompt to an ontology using a domain-specific language. The feature extractors 114 can include a classifier 132 that uses a supervised ML model trained on a dataset. The dataset can include a plurality of products and corresponding feature vectors to train the classifier 130. The processor 110 can iteratively train the classifier 130 until convergence based on adjusting a plurality of hyperparameters to improve the supervised ML model of the classifier 130. The classifier 130 can generate feature vectors using the mapped prompt to the ontology and identify the plurality of attributes according to the feature vectors.

At step 604, the one or more processors (e.g., content item generator 116) can generate, for each attribute, a plurality of content items. The content items can correspond to any content associated with the attribute of the product. For example, the content item generator 116 can generate social media posts, news articles, videos, images, and text associated with a product. In this manner, the content item generator 116 can generate content items 106 using at least one attribute in accordance with the product or deliverable, without wasting significant computing resources to submit requests to servers to transmit a plurality of images, labels, and videos to the management system 102.

At step 606, the one or more processors (e.g., targeting criteria generator 118) can generate, for each content item, serving criteria to serve the content items. The serving criteria can result in the content items being served to the potential customers who are the most likely to respond positively to them. The targeting criteria generator 118 can use one or more ML models 128 (e.g., supervised ML models) to generate the serving criteria to induce a user interaction with the content (e.g., to identify which users/types of users/etc. are most likely to interact with the content). Furthermore, the targeting criteria generator can generate, using the plurality of attributes, a dynamic test matrix. Each matrix cell can correspond to a respective attribute and serving criteria for the one or more ML models 128. From here, the content item generator 116 can generate content items that communicate information corresponding to the attribute, for serving to client devices according to the serving criteria In this manner, the targeting criteria generator 118 can determine the serving criteria on the fly based on a plurality of ML techniques to save computing resources and personalize the criteria according to the user and aide the content item generator 116 in generating content items 106.

At step 608, the one or more processors (e.g., address generator 120) can assign a respective content item URL to each content item. The content item URL can correspond to a website, web domain, or a web source associated with a landing page URL. The content item URL can be embedded within the content items, to cause redirection to a landing page URL associated with a prospective landing page to be generated. In some cases, the user can interact with the content item URL, causing the client device 108 to be redirected to the landing page URL. The landing page URL can include a respective landing page for the user. Furthermore, the address generator 120 can generate a distinct URL for every content item. Accordingly, the URL can be uniquely associated with the specific content item and being used to track the interactions of users with that content item 106.

At step 610, the one or more processors (e.g., landing page generator 122) can generate a landing page based on a content item that was interacted with. The processor 110 can receive an indication of the interaction with the content item at the client device 108, and generate the landing page responsive to receiving the indication of the interaction. For example, when the user interacts with a first content item, the landing page generator 122 can generate a first landing page corresponding to the content item. The landing page generator 122 can use a template engine (e.g., one or more ML models 128) to generate the landing pages in response to an interaction with the content times and redirect the client device to landing page URL associated with the content item. To generate the landing page that includes at least some of a plurality of content blocks, according to a templated layout, the landing page generator 122 can apply the content item and the attribute as an input to the one or more large language models, to generate content of the plurality of content blocks. The landing page generator 122 can then generate the landing page by assembling the content blocks (e.g., generated using the one or more large language models) according to the templated layout.

Upon receiving the indication of the interaction, the landing page generator 122 can generate, using the one or more large language models, the landing page (and/or sub-landing pages) dynamically. By dynamically adjusting the landing page, the landing page generator can use the ML models 128 (e.g., reinforced learning model) to present content in accordance with the interactions by the user. For example, the landing page generator 122 can use content with positive interactions on subsequently generated landing pages (e.g., for the user, or for any other users that interact with similar content items). In some embodiments, where the landing page includes a chatbot, the processor 110 can use interactions with the chatbot to determine one or more analytics relating to the interactions received from the client device and provided to the landing page. The analytics an include preferences, user behavior, interaction data, and the like. Subsequently, the processor 110 can apply the one or more analytics to the ML models 128 (e.g., a reinforcement model) associated with the one or more large language models, for generating subsequent instances of landing pages associated with the content item.

In some embodiments, the processor 110 can transmit, responsive to receiving the indication of the interaction with the content item, to one or more servers (e.g., third-party servers 408), a request to retrieve cataloged records 410 maintained by the one or more servers. The request can include a filter according to the attribute which corresponds to the content item. From here, the processor 110 can receive from the third-party servers 408, a plurality of cataloged records 410 that are associated with the product for the user. Each of the catalogued records can correspond to a content item block (e.g., products for purchase, for instance) for the landing page. The processor 110 can use the ML models 128 to apply a ranking algorithm to the plurality of cataloged records. The ranking algorithm can identify a ranked subset of the plurality of cataloged records, based on a keyword density of each cataloged record and a priority score associated with the cataloged record. In this manner, the content item generator 116 can use the subset of catalogued records to generate content for the landing page according to the ranking. The landing page generator 122 can retrieve the ranked subset of catalogue records and populate the landing page with the ranked subset of cataloged records the content item servers 304.

At step 612, the one or more processors (e.g., data structure updater 126) can store an association between the attribute, the content item, the language item, and interactions of the user. By storing the associations, the data structure updater 126 can maintain a record 404 of history for the user. From here, the processor 110 can update the ML models 128 using the records for a respective user to provide more effective content items during future presentations of the content items 106 to the user.

Referring generally to the Figures, the systems and methods described herein may use or leverage various large language models (LLM) for, e.g., generating attributes 202, content items 106, and/or landing pages 124. An LLM may be a type of artificial intelligence model that is trained on vast amounts of text data. The LLM may be configured to generate text/content that is coherent and contextually relevant based on a given prompt. This capability is leveraged in the system to generate attributes and content items. The LLM(s) may be trained using a variety of text data, which can include books, articles, websites, and other forms of written content. The training process involves feeding the LLM with this text data and using machine learning algorithms to adjust the model's parameters. This process enables the LLM to learn the patterns and structures of the language, allowing it to generate text that is human-like and coherent. When provided with a prompt, the LLM generates text based on the patterns and structures it has learned during training. The prompt serves as an input to the LLM, guiding it in generating content that is relevant to the prompt. Through this process, the system leverages the capabilities of the LLM to generate a diverse range of attributes and content items that effectively communicate the attribute to the target audience. This allows the system to generate a rich and comprehensive set of attributes and content items for the product, providing valuable insights that can be used to optimize the system and improve its effectiveness.

The following definitions are provided to facilitate understanding of the context of the present solution and the embodiments of the present disclosure provided herein.

Value Proposition: A value proposition, in this context, can be or include a statement, text, or other data indicative of a benefit corresponding to a particular prompt. For example, a value proposition may explain how a product solves a customer's problem, delivers specific benefits, and tells the customer why they should buy the product from a particular company instead of from a competitor. The term value proposition can be used interchangeably with features, attributes, or similar terminology.

Content Item: A content item, in this context, can be or include any content that is used to communicate the value proposition to potential customers. The content items described herein could include, for example, advertisements (e.g., personalized or mass-advertisements), social media posts, blog articles, product descriptions, and more. The content items are generated in such a way that they effectively communicate the value proposition to the target audience.

Serving Criteria: Serving criteria, in this context, can be or include a criteria for which to serve content items to a target audience. The serving criteria can include demographic information, geographic location, user behavior, and other factors that are relevant to the effective delivery of the content items to a target audience.

Content Item URL: A content item URL, in this context, can be or include a specific address that is associated with a particular content item. The content item URL is designed to be used as a link that can be clicked on, tapped, selected, or otherwise interacted with by a user, leading to a specific location on the internet. In the context of this system, the content item URL is configured to route a client device to a landing page.

Landing Page: A landing page, in this context, can be or include is a specific webpage designed based on or according to a particular content item. As described herein, the system may generate landing page on-demand (or on-the-fly) using a large language model or other artificial intelligence technology, based on a content item that was interacted with by a user of a client device.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system comprising:

one or more hardware processors coupled to memory and configured to:

receive, from one or more feature extractors, a plurality of attributes generated according to an input;

generate, using one or more large language models, for each attribute of the plurality of attributes, a plurality of content items;

generate, for each content item of the plurality of content items, serving criteria according to which to serve the plurality of content items;

assign to each content item of the plurality of content items, a respective content item URL to cause a client device which is served content items to be redirected to a landing page URL, responsive to an interaction with the respective content item;

automatically generate, using the one or more large language models, a landing page based on a content item that was interacted with, the landing page generated responsive to the interaction with the content item and the client device being redirected to the landing page URL; and store, in one or more data structures, an association between the attribute, the content item, the landing page, and interactions of a user with the landing page.

2. The system of claim 1, wherein the one or more feature extractors comprise a natural language processing (NLP) model configured to map the input to an ontology using a domain-specific language, and a classifier comprising a supervised machine learning model trained on a dataset, configured to generate feature vectors using the mapped input to the ontology, the classifier configured to identify the plurality of attributes according to the feature vectors.

3. The system of claim 1, wherein the one or more hardware processors are further configured to generate, using the plurality of attributes, a dynamic test matrix, each matrix cell corresponding to a respective attribute of the plurality of attributes and serving criteria.

4. The system of claim 1, wherein the one or more hardware processors are configured to generate content items that communicate information corresponding to the attribute, for serving to client devices according to the serving criteria.

5. The system of claim 1, wherein the one or more hardware processors are configured to generate a distinct URL for every content item, the URL being uniquely associated with the respective content item and being used to track interactions of users with that content item.

6. The system of claim 1, wherein the one or more hardware processors are configured to:

receive, from the client device, an indication of the interaction with the content item; and generate, using the one or more large language models, the landing page automatically, responsive to receiving the indication of the interaction with the content item, wherein, to generate the landing page, the one or more hardware processors are configured to:

apply the content item and the attribute as an input to the one or more large language models, to generate content of a plurality of content blocks; and generate the landing page which includes at least some of the plurality of content blocks, according to a templated layout.

7. The system of claim 6, wherein the one or more hardware processors are configured to:

transmit, responsive to receiving the indication of the interaction with the content item, to one or more servers, a request to retrieve cataloged records maintained by the one or more servers, the request including a filter according to the attribute which corresponds to the content item;

receive, from the one or more servers, responsive to the request, a plurality of cataloged records;

apply a ranking algorithm to the plurality of cataloged records, to identify a ranked subset of the plurality of cataloged records, based on a keyword density of each cataloged record and a priority score associated with the cataloged record; and populate the landing page with the ranked subset of cataloged records retrieved from the one or more servers.

8. The system of claim 6, wherein the landing page generated for the content item comprises a first landing page provided to a first subset of client devices which satisfy the serving criteria, and wherein the one or more large language models are configured to generate a second landing page for a second subset of clients which satisfy the serving criteria.

9. The system of claim 8, wherein content of the first landing page and the second landing page is dynamically adjusted by the one or more large language models, using a reinforcement learning model trained based on the interactions of respective users with the first landing page and the second landing page.

10. The system of claim 1, wherein the interactions comprise at least one of clicks, hovers, or navigation patterns, and wherein the one or more hardware processors are configured to:

determine one or more analytics relating to the interactions received from the client device relating to the landing page; and apply the one or more analytics to a reinforcement model associated with the one or more large language models, for generating subsequent instances of landing pages associated with the content item.

11. The system of claim 1, wherein the one or more hardware processors are further configured to:

receive, from the client device, a navigation input within the landing page;

generate, using the one or more large language models, a sub-landing page within the landing page, responsive to receiving the navigation input.

12. The system of claim 1, wherein the input relates to a deliverable, wherein each of the plurality of attributes relate to one or more features of the deliverable, and wherein the content items for a corresponding attribute each correspond to the one or more features.

13. The system of claim 12, wherein a first landing page for a first content item of a first attribute for the deliverable is uniquely relative to a second landing page for a second content item of a second attribute for the deliverable.

14. The system of claim 13, wherein the first landing page and the second landing page comprise semi-functional dummy landing pages.

15. A method, comprising:

transmitting, by one or more hardware processors of a computing system, to one or more feature extractors, a prompt to retrieve attributes relating to a deliverable;

receiving, by the one or more hardware processors, from the one or more feature extractors, a plurality of attributes determined based on the deliverable and according to the prompt;

generating, by the one or more hardware processors, using one or more large language models, for each attribute of the plurality of attributes, a plurality of content items;

generating, by the one or more hardware processors, for each content item of the plurality of content items, serving criteria according to which to serve the plurality of content items;

assigning, by the one or more hardware processors, to each content item of the plurality of content items, a respective content item URL to cause a client device which is served content items to be redirected to a landing page URL, responsive to an interaction with the respective content item;

automatically generating, by the one or more hardware processors, using the one or more large language models, a landing page based on a content item that was interacted with, the landing page generated responsive to the interaction with the content item and the client device being redirected to the landing page URL; and storing, by the one or more hardware processors, in one or more data structures, an association between the attribute, the content item, the landing page, and interactions of a user with the landing page.

16. The method of claim 15, wherein the one or more feature extractors comprise a natural language processing (NLP) model configured to map the prompt to an ontology using a domain-specific language, and a classifier comprising a supervised machine learning model trained on a dataset, configured to generate feature vectors using the mapped prompt to the ontology, the classifier configured to identify the plurality of attributes according to the feature vectors.

17. The method of claim 15, further comprising:

receiving, by the one or more hardware processors, from the client device, an indication of the interaction with the content item; and generating, by the one or more hardware processors, using the one or more large language models, the landing page automatically, responsive to receiving the indication of the interaction with the content item, wherein generating the landing page comprises:

applying the content item and the attribute as an input to the one or more large language models, to generate content of a plurality of content blocks; and generate the landing page which includes at least some of the plurality of content blocks, according to a templated layout.

18. The method of claim 17, further comprising:

transmitting, by the one or more hardware processors, responsive to receiving the indication of the interaction with the content item, to one or more servers, a request to retrieve cataloged records maintained by the one or more servers, the request including a filter according to the attribute which corresponds to the content item;

receiving, by the one or more hardware processors, from the one or more servers, responsive to the request, a plurality of cataloged records;

applying, by the one or more hardware processors, a ranking algorithm to the plurality of cataloged records, to identify a ranked subset of the plurality of cataloged records, based on a keyword density of each cataloged record and a priority score associated with the cataloged record; and populating, by the one or more hardware processors, the landing page with the ranked subset of cataloged records retrieved from the one or more servers.

19. The method of claim 15, wherein the landing page generated for the content item comprises a first landing page provided to a first subset of client devices which satisfy the serving criteria, and wherein the one or more large language models are configured to generate a second landing page for a second subset of clients which satisfy the serving criteria, wherein content of the first landing page and the second landing page is dynamically adjusted by the one or more large language models, using a reinforcement learning model trained based on the interactions of respective users with the first landing page and the second landing page.

20. A non-transitory computer readable medium storing instructions that, when executed by one or more hardware processors, cause the one or more hardware processors to:

receive, from one or more feature extractors, a plurality of attributes generated according to an input;

generate, using one or more large language models, for each attribute of the plurality of attributes, a plurality of content items;

generate, for each content item of the plurality of content items, serving criteria according to which to serve the content items;

assign to each content item of the plurality of content items, a respective content item URL to cause a client device which is served content items to be redirected to a landing page URL, responsive to an interaction with the respective content item;

automatically generate, using the one or more large language models, a landing page based on a content item that was interacted with, the landing page generated responsive to the interaction with the content item and the client device being redirected to the landing page URL; and store, in one or more data structures, an association between the attribute, the content item, the landing page, and interactions of a user with the landing page.

* * * * *